United States Patent Office 3,655,805
Patented Apr. 11, 1972

3,655,805
DEHYDROGENATION PROCESS
Louis J. Croce, Seabrook, Tex., and Laimonis Bajars, Princeton, and Maigonis Gabliks, Highland Park, N.J., assignors to Petro-Tex Chemical Corporation, Houston, Tex.
No Drawing. Continuation-in-part of application Ser. No. 459,878, May 28, 1965. This application Nov. 29, 1968, Ser. No. 780,271
Int. Cl. C07c *5/18*
U.S. Cl. 260—680 E 10 Claims

ABSTRACT OF THE DISCLOSURE

Oxidative dehydrogenation of organic compounds in presence of compositon comprising crystalline composition of iron, Group III–B metals and oxygen, preferably ferrites.

---

This application is a continuation-in-part of Ser. No. 459,878, filed May 28, 1965 and entitled Chemical Process.

This invention relates to a process of dehydrogenating organic compounds at elevated temperatures and with particular catalysts. The catalysts of this invention are crystalline compositions which contain oxygen, iron and a Periodic Table Group III–B metal.

The total number of atoms of the Group III–B metal(s) will be from .35 to .6 or .7 total atom per atom of iron. The Group III–B metals are those as found in the Periodic Table as found on pages 400–401 of the Handbook of Chemistry and Physics (39th edition, 1957–8, Chemical Rubber Publishing Co.). Excellent catalysts have been prepared having from 30 to 90 weight percent of the Group III–B atoms based on the total weight of Group III–B and iron. A preferred type of catalyst of this type is that having a face-centered cubic form of crystalline structure. The catalysts of this invention may be compositions having the metallic ions distributed in different manners in the crystalline structure. Thus, the metallic ingredients may be arranged in the crystal either in "normal" or "inverse" arrangement. Catalysts having individual crystal structures intermediate between normal and inverse are within the scope of this invention. Also encompassed would be catalysts having a mixture or combination of crystals of different type. It is not necessary that the catalysts contain all of the iron or the Group III–B metal in a crystalline structure. It is also possible for the defined ingredients to be partially present as interstitial components, or as substitutional components in solid solution with the normal crystalline structure, rather than being in the normal crystalline structure. Precipitates from solid solution may also be included in the catalyst. Any iron not present in the form of the crystalline composition will desirably be present predominantly as gamma iron oxide. The alpha iron oxide will preferably be present in an amount of no greater than 40 weight percent of the catalytic surface, such as no greater than about 30 weight percent.

The valency of the metals in the catalysts do not have to be any particular values, although certain combinations are preferred or disclosed elsewhere. The determination of the valency of the ions is sometimes difficult and the results are uncertain. The different ions may exist in more than one valency state. However, a preferred catalyst is one which has the iron predominately in the $Fe^{+++}$ state. Ferrites are described in Ferromagnetism, by Richard M. Bozorth (D. Van Nostrand Co., Inc., 1951), which disclosure is hereby incorporated by reference. Preferred catalysts will have iron in the catalyst surface in an amount from 20 to 95, and preferably from 30 to 90 weight percent of the total weight of iron and Group III–B metals.

The preferred catalysts are the ferrites having a cubic face-centered configuration. The ferrites will not be present in the most highly oriented crystalline structure, because it has been found that superior results may be obtained with catalysts wherein the crystalline structure of the composition is relatively disordered. The desired catalysts may be obtained by conducting the reaction to form the ferrite at relatively low temperatures, that is, at temperatures high enough to form the crystalline formation but lower than some of the very high temperatures used for the formation of ferrites prepared for semi-conductor applications. Included in the definition of ferrites are the so-called intermediate oxides. The temperature of reaction for the formation of the catalysts preferably will be no greater than or less than 1000° C. and preferably less than 600° C. or 700° C.

According to this invention it has been found that the preferred catalysts exhibit a certain type of X-ray diffraction pattern. The preferred compositions do not have as sharp X-ray diffraction reflection peaks as would be found, e.g., in a high crystalline material having the same chemical composition. Instead, the preferred catalysts of this invention exhibit reflection peaks which are relatively broad. The degree of sharpness of the reflection peak may be measured by the reflection peak band width at half height (W *h/2*). In other words, the width of the reflection peak as measured at one-half of the distance to the top of the peak is the "band width at half height." The band width at half height is measured in units of ° 2 theta. Techniques for measuring the band widths are discussed, e.g., in chapter 9 of Klug and Alexander, X-ray Diffraction Procedures, John Wiley and Son, N.Y., 1954. The observed band widths at half height of the preferred catalysts of this invention are at least 0.16° 2 theta and normally will be at least 0.20° 2 theta.[1] For instance, excellent oxidants have been made with band widths at half height of at least 0.22 or 0.23° 2 theta. The particular reflection peak used to measure the band width at one-half height is the reflection peak having Miller (hkl) indices of 220. (See, e.g., chapter of Klug and Alexander, ibid.). This application is not limited as to any theory of the invention in regard to the relationship between activity and band width.

The crystalline compositions may be produced by any method for producing the desired reaction product. The iron and/or Group III–B compound used as starting materials may be oxides or precursors of oxides. A preferred method is to employ techniques to provide intimate contact of the Group III–B and iron reactants than is possible with conventional mixing of oxides.

The Group III–B and iron starting materials will suitably be any compounds that will form the compositions and generally will be precursors of Group III–B oxides and iron oxide under the conditions to form the composition. It is believed that compounds other than oxides are converted to oxides during the formation of the ferrite, but this may not necessarily be true. For example,

---

[1] The powder diffraction patterns may be made, e.g., with a Norelco constant potential diffraction unit type No. 12215/0 equipped with a wide range goniometer type No. 42273/0, cobalt tube type No. 32119, proportional counter type No. 57250/1; all coupled to the Norelco circuit panel type No. 12206/53. The cobalt K alpha radiation is supplied by operating the tube at a constant potential of 30 kilovolts and a current of 10 milliamperes. An iron filter is used to remove K beta radiation. The detector voltage is 1660 volts and the pulse height analyzer is set to accept pulses with amplitudes between 10 and 30 volts only. Slits used are divergence 1°, receiving .006 inch and scatter 1°. Strip chart recordings for identification are made with a scanning speed of ¼° per minute, time constant of 4 seconds and a full scale at $10^3$ counts per second. No correction is made for K *a* doublet or instrumental broadening of the band widths.

iron carbonate or oxalate is probably converted to iron oxide prior to or during ferrite formation. Because many of the Group III–B metals have more than one oxide it is possible for various oxides to be present at one or more stages in the process to produce the catalyst. The Group III–B metal may be e.g. La, Ce, Pr, Nd, Th, Pa, U, mixtures thereof, etc. An especially suitable source of mixed oxides or salts are the didymium mixtures, which are the mixtures which may be obtained after removal of most of the cerium and thorium from rare earth ores. Starting materials may be such as oxides, hydroxides, or salts including oxalates, acetates, formates, sulfates, nitrates, halides, hydrates and so forth. Suitable Group III–B and Fe compounds are such as cerous oxalate, cerous citrate, lanthanum oxide, thorium carbonate or nitrate, cerous hydroxide, ceric nitrate, cer(ous or ic) oxide, rare earth oxides and chlorides, Group III–B salts of aliphatic monocarboxylic acids of 1 to 5 carbon atoms, sulfates, aliphatic alcohols of 1 to 5 carbon atoms, hydrates thereof, the corresponding iron compounds such as $Fe_2O_3$ and mixtures thereof. Suitably, the iron will have a valence predominantly of +3 after the catalyst is formed. The catalysts may be employed as such or carriers may be used.

The catalyst formation may be conducted in the presence of catalysts to promote the catalyst formation. Halogens such as chlorine, bromine and iodine and compounds thereof may be used. The preferred halogen is chlorine. Examples of catalysts used to promote catalyst formation are HCl, $Cl_2$, $Br_2$, cerous chloride, iron chloride and the like.

The preferred method of forming the catalyst is to employ techniques to provide more intimate contact of the Group III–B metal and iron reactants than is possible with conventional mixing of oxides. One technique is to coprecipitate salts of the compounds and form a crystalline structure by heating the coprecipitate. This conversion may be preceded by a drying operation or may be carried out by heating the precipitate in the reaction liquid. The heating may also be partially or completely performed under conditions such as dehydrogenation in which case the catalyst formation is accomplished or completed in situ. Further, heating for ferrite formation is sometimes desirable in the presence of the compound to be dehydrogenated such as a hydrocarbon.

The catalysts of this invention may comprise additives, e.g. such as phosphorus or silicon. Methods and relative quantities for the incorporation of phosphorus and silicon are disclosed in U.S. 3,270,080, issued Aug. 30, 1966 and U.S. 3,303,238, issued Apr. 2, 1964 with the same teachings being applied to the catalysts of this invention.

The process of this invention may be applied to the dehydrogenation of a great variety of organic compounds to obtain the corresponding unsaturated derivative thereof. Such compounds normally will contain from 2 to 20 carbon atoms, at least one

grouping, a boiling point below about 350° C., and such compounds may contain other elements, in addition to carbon and hydrogen such as oxygen, halogens, nitrogen and sulphur. Preferred are compounds having from 2 to 12 carbon atoms, and especially preferred are compounds of 2 to 6 carbon atoms.

Among the types of organic compounds which are successfully dehydrogenated to the corresponding unsaturated derivative by means of the novel process of this invention are nitriles, amines, alkyl halides, ethers, esters, aldehydes, ketones, alcohols, acids, alkyl aromatic compounds, alkyl heterocyclic compounds, cycloalkanes, alkanes, alkenes, and the like. Illustrative dehydrogenations include propionitrile to acrylonitrile, propionaldehyde to acrolein, ethyl chloride to vinyl chloride, methyl isobutyrate to methyl methacrylate, 2,3 dichlorobutane to chloroprene, ethyl pyridine to vinyl pyridine, ethylbenzene to styrene, isopropylbenzene to α-methyl styrene, ethylcyclohexane to styrene, cyclohexane to benzene, ethane to ethylene, propane to propylene, isobutane to isobutylene, n-butane to butene and butadiene-1,3, butene to butadiene-1,3, n-butane to vinyl acetylene, methyl butene to isoprene, cyclopentane to cyclopentene and cyclopentadiene-1,3, n-octane to ethyl benzene and orthoxylene, monomethylheptanes to xylenes, propane to propylene to benzene, ethyl acetate to vinyl acetate, 2,4,4-trimethylpentane to xylenes, and the like. This invention is useful for the formation of new carbon to carbon bonds by the removal of hydrogen atoms such as the formation of a carbocyclic compound from two aliphatic hydrocarbon compounds or the formation of a dicyclic compound from a monocyclic compound having an acyclic group. Examples of conversions are the conversion of n-heptane to toluene and propene to diallyl. Representative materials which are dehydrogenated by the novel process of this invention include ethyl toluene, alkyl chlorobenzenes, ethyl naphthalene, isobutyronitrile, propyl chloride, isobutyl chloride, ethyl fluoride, ethyl bromide, n-pentyl iodide, ethyl dichloride, 2,3-dichlorobutane, 1,3 dichlorobutane, 1,4 dichlorobutane, the chlorofluoroethanes, methyl pentane, methylethyl ketone, diethyl ketone, n-butyl alcohol, methyl propionate, and the like. This invention is particularly adapted to the preparation of vinylidene compounds containing at least one $CH_2{=}C{<}$ group, that is, a group containing a terminal methylene group attached by a double bond to a carbon atom, and having 2 to 12 carbon atoms by the dehydrogenation of compounds of the formula $CH_3{-}CH_2{-}R$ wherein R is an organic radical of from 0 to 10 carbon atoms, preferably a hydrocarbon. Similarly, acetylenic compounds of the formula $CH{\equiv}C{-}$ may be produced from the same starting materials. Hydrocarbons are the preferred compounds to be dehydrogenated and especially preferred are hydrocarbons of 3 to 8 carbon atoms including a preferred class of aliphatic hydrocarbons of 4 to 5 carbon atoms having a straight chain of at least 4 carbon atoms.

Preferably oxygen is employed, suitably in an amount within the range of 0.2 to about 5.0 mols of oxygen per mol of organic compound to be dehydrogenated, preferably from 0.2 to 2.5 mols per mol. Generally, better results may be obtained if the oxygen concentration is maintained between about 0.25 and about 1.6 mols of oxygen per mol of organic compound to be dehydrogenated, such as between 0.35 and 1.2 mols of oxygen. The oxygen may be fed to the reactor as pure oxygen, as air, as oxygen-enriched air, oxygen mixed with diluents, and so forth. Included in these methods to supply the oxygen are transport or moving oxidant type processes such as disclosed in U.S. 3,050,572, issued Aug. 21, 1962 or U.S. 3,118,007, issued Jan. 14, 1964 in which case the catalysts of this invention can partially or completely furnish the required oxygen. Based on the total gaseous mixture entering the reactor, good results are obtained with oxygen present in an amount from about 0.5 to 25 volume percent of the total gaseous mixture, such as in an amount from about 1 to 15 volume percent of the total. The total amount of oxygen utilized may be introduced into the gaseous mixture entering the catalytic zone or sometimes it has been found desirable to add the oxygen in increments, such as to different sections of the reactor. The above described proportions of oxygen employed are based on the total amount of oxygen used. The oxygen may be added directly to the reactor or it may be premixed, for example, with a diluent or steam. The process of this invention is an oxidative dehydrogenation process wherein the predominant mechanism of dehydrogenation is by a reaction of oxygen with hydrogen and preferably at least 85 or 90 mol percent of the hydrogen atoms removed are by this reaction.

It is one of the advantages of this invention that halogen may also be added to the reaction gases to give excellent results. The addition of halogen to the feed is particularly effective when the hydrocarbon to be dehydrogenated is saturated. The halogen fed to the dehydrogenation zone may be either elemental halogen or any compound of halogen which would liberate halogen under the conditions of reaction. Suitable sources of halogen are such as hydrogen iodide, hydrogen bromide and hydrogen chloride; aliphatic halides, such as ethyl iodide, methyl bromide, 1,2-dibromo ethane, ethyl bromide, amyl bromide, and allyl bromide; cycloaliphatic halides, such as cyclohexylbromide; aromatic halides, such as benzyl bromide; halohydrins, such as ethylene bromohydrin; halogen substituted aliphatic acids, such as bromoacetic acid; ammonium iodide; ammonium bromide; ammonium chloride; organic amine halide salts, such as methyl amine hydrobromide; and the like. Mixtures of various sources of halogen may be used. The preferred sources of halogen are iodine, bromine, and chlorine, and compounds thereof, such as hydrogen bromide, hydrogen iodide, hydrogen chloride, ammonium bromide, ammonium iodide, ammonium chloride, alkyl halides of one to six carbon atoms and mixtures thereof, with the iodine and bromine compounds being particularly preferred and the best results having been obtained with ammonium iodide, bromide, or chloride. When terms such as halogen liberating materials or halogen materials are used in the specification and claims, this includes any source of halogen such as elemental halogens, hydrogen halides, or ammonium halides. The amount of halogen, calculated as elemental halogen, may be as little as about 0.0001 or less mol of halogen per mol of the organic compound to be dehydrogenated to as high as 0.2 or 0.5. The preferred range is up to 0.09 mol of halogen per mol of the organic compound to be dehydrogenated.

The temperature for the dehydrogenation reaction generally will be at least about 250° C., such as greater than about 300° C. or 375° C., and the maximum temperature in the reactor may be about 650° C. or 750° C. or perhaps higher under certain circumstances. However, excellent results are obtained within the range of or about 300° C. to 575° C. or 700° C., such as from or about 325° C. to or about 525° C. or 675° C. The temperatures are measured at the maximum temperature in the reactor. An advantage of this invention is that lower temperatures of dehydrogenation may be utilized than are possible in conventional dehydrogenation processes. Another advantage is that large quantities of heat do not have to be added to the reaction as was previously required.

The dehydrogenation reaction may be carried out at atmospheric pressure, superatmospheric pressure or at sub-atmospheric pressure. The total pressure of the system will normally be about or in excess of atmospheric pressure, although sub-atmospheric pressure may also desirably be used. Generally, the total pressure will be between about 4 p.s.i.a. and about 100 or 125 p.s.i.a. Preferably, the total pressure will be less than about 75 p.s.i.a. and excellent results are obtained at about atmospheric pressure.

The initial partial pressure of the organic compound to be dehydrogenated will preferably be equivalent to equal to or less than one-half atmosphere at a total pressure of one atmosphere. Generally, the combined partial pressure of the organic compound to be dehydrogenated, together with the oxygen, will also be equivalent to less than one-half atmosphere at a total pressure of one atmosphere. Preferably, the initial partial pressure of the organic compound to be dehydrogenated will be equivalent to no greater than one-third atmosphere or no greater than one-fifth atmosphere at a total pressure of one atmosphere. Also, preferably, the initial partial pressure of the combined organic compound to be dehydrogenated plus the oxygen will be equivalent to no greater than one-third or no greater than one-fifth atmosphere at a total pressure of one atmosphere. Reference to the initial partial pressure of the organic compound to be dehydrogenated means the partial pressure of the organic compound as it first contacts the catalytic particles. An equivalent partial pressure at a total pressure of one atmosphere means that one atmosphere total pressure is a reference point and does not imply that the total pressure of the reaction must be operated at atmospheric pressure. For example, in a mixture of one mol of ethyl chloride, three mols of steam, and one mol of oxygen under a total pressure of one atmosphere, the ethyl chloride would have an absolute pressure of one-fifth of the total pressure, or roughly six inches of mercury absolute pressure. Equivalent to this six inches of mercury-ethyl chloride absolute pressure at atmospheric pressure would be ethyl chloride mixed with oxygen under a vacuum such that the partial pressure of the ethyl chloride is 6 inches of mercury absolute. The combination of a diluent such as nitrogen, together with the use of a vacuum, may be utilized to achieve the desired partial pressure of the organic compound. For the purpose of this invention, also equivalent to the six inches of mercury ethyl chloride absolute pressure at atmospheric pressure would be the same mixture of one mol of ethyl chloride, three mols of steam, and one mol of oxygen under a total pressure greater than atmospheric, for example, a total pressure of 20 p.s.i.a. Thus, when the total pressure in the reaction zone is greater than one atmosphere, the absolute values for the pressure of the organic compound to be dehydrogenated will be increased in direct proportion to the increase in total pressure above one atmosphere.

The partial pressures described above may be maintained by the use of diluents such as nitrogen, helium or other gases. Conveniently, the oxygen may be added as air with the nitrogen acting as a diluent for the system. Mixtures of diluents may be employed. Volatile compounds which are not dehydrogenated or which are dehydrogenated only to a limited extent may be present as diluents.

Preferably, the reaction mixture contains a quantity of steam, with the range generally being between about 2 and 40 mols of steam per mol of organic compound to be dehydrogenated. Preferably, steam will be present in an amount from about 3 to 35 mols per mol of organic compound to be dehydrogenated and excellent results have been obtained within the range of about 5 to about 30 mols of steam per mol of organic compound to be dehydrogenated. The functions of the steam are several-fold, and the steam may not merely act as a diluent. Diluents generally may be used in the same quantities as specified for the steam. Excellent results are obtained when the gaseous composition fed to the reactor consists essentially of the organic compound to be dehydrogenated, inert diluents, and oxygen as the sole oxidizing agent.

The gaseous reactants may be conducted through the reaction chamber at a fairly wide range of flow rates. The optimum flow rate will be dependent upon such variables as the temperature of reaction, pressure, particle size, and whether a fluid bed or fixed bed reactor is utilized. Desirable flow rates may be established by one skilled in the art. Generally, the flow rates will be within the range of about 0.10 to 25 liquid volumes of the organic compound to be dehydrogenated per volume of reactor containing catalyst per hour (referred to as LHSV), wherein the volumes of organic compound are calculated at standard conditions of 0° C. and 760 mm. of mercury. Usually, the LHSV will be between 0.15 and about 5 or 10. For calculation, the volume of reactor containing catalyst is that volume of reactor space including the volume displaced by the catalyst. For example, if a reactor has a particular volume of cubic feet of void space, when that void space is filled with catalyst particles, the original void space is the volume of reactor containing catalyst for the purpose of calculating the flow rate. The gaseous hourly space velocity (GHSV) is the volume of the organic compound to be dehydrogenated in the form of vapor calculated under standard conditions of 0° C. and 760 mm. of mercury per volume of reactor space containing catalyst per hour. Generally, the GHSV will be between about 25 and 6400, and excellent results have been obtained between about 38 and 3800. Suitable contact times are, for example, from about 0.001 or higher to about 4 or 10 or 20 seconds, with particularly good results being obtained between 0.01 and 5 seconds. The contact time is the calculated dwell time of the reaction mixture in the reaction zone, assuming the mols of product mixture are equivalent to the mols of feed mixture. For the purpose of calculation of contact times, the reaction zone is the portion of the reactor containing catalyst which is at a temperature of at least 250° C.

The catalytic surface described is the surface which is exposed in the dehydrogenation zone to the reactor; that is, if a catalyst carrier is used, the composition described as a catalyst refers to the composition of the surface and not to the total composition of the surface coating plus carrier. Catalyst binding agents or fillers may be used, but these will not ordinarily exceed about 50 percent or 60 percent by weight of the catalytic surface. These binding agents and fillers will preferably be essentially inert. Preferred catalysts are those that have as a catalytic surface exposed to the reaction gases at least 25 or preferably 50 weight percent of the defined catalytic surface. Also preferably iron will constitute at least 50 atomic weight percent of the cations in the catalytic surface. Suitable catalysts are those which do not contain sodium or potassium as an additive in the crystal structure, such as those containing less than 5 or less than 2 percent by weight of sodium or potassium based on the total weight of the catalyst. This is particularly true for processes that do not utilize halogen in the gaseous feed to the reactor.

The catalyst will by definition be present in a catalytic amount. The amount of catalyst will ordinarily be present in an amount greater than 10 square feet of catalyst surface per cubic foot of reaction zone containing catalyst. Of course, the amount of catalyst may be much greater, particularly when irregular surface catalysts are used. When the catalyst is in the form of particles, either supported or unsupported, the amount of catalyst surface may be expressed in terms of the surface area per unit weight of any particular volume of catalyst particles. The ratio of catalytic surface to weight will be dependent upon various factors, including the particle size, particle size distribution, apparent bulk density of the particles, amount of active catalyst coated on the carrier, density of the carrier, and so forth. Typical values for the surface to weight ratio are such as about one-half to 200 square meters per gram, although higher and lower values may be used.

The dehydrogenation reactor may be of the fixed bed or fluid bed type. Conventional reactors for the production of unsaturated organic compounds by dehydrogenation are satisfactory. Excellent results have been obtained by packing the reactor with catalyst particles as the method of introducing the catalytic surface. The catalytic surface may be introduced as such or it may be deposited on a carrier by methods known in the art such as by preparing an aqueous solution or dispersion of a catalytic material and mixing the carrier with the solution or dispersion until the active ingredients are coated on the carrier. If a carrier is utilized, very useful carriers are silicon carbide, aluminum oxide, magnesia, pumice, and the like. Other known catalyst carriers may be employed. When carriers are used, the amount of catalyst on the carrier will suitably be between about 5 to 75 weight percent of the total weight of the active catalytic material plus carrier. Another method for introducing the required surface is to utilize as a reactor a small diameter tube wherein the tube wall is catalytic or is coated with catalytic material. Other methods may be utilized to introduce the catalytic surface such as by the use of rods, wires, mesh, or shreds, and the like, of catalytic material.

According to this invention, the catalyst may be autoregenerative and the process may be continuous. Moreover, small amounts of tars and polymers are formed as compared to some prior art processes.

In the following examples will be found specific embodiments of the invention and details employed in the practice of the invention. Percent conversion refers to the mols of organic compound to be dehydrogenated that is consumed, based on the mols of the said organic compound fed to the reactor, percent selectivity refers to the mols of product formed based on the mols of the said organic compound consumed, and percent yield refers to the mols of product formed based on the mols of the said organic compound fed.

EXAMPLE 1

A catalyst is prepared according to this invention by reacting 65.1 grams of $Ce(NO_3)_3 \cdot 6H_2O$ with 101.0 grams of $Fe(NO_3)_3 \cdot 9H_2O$. The nitrates are dissolved with heat in 250 cc. distilled water and the mixed nitrates are slowly added to 300 cc. of concentrated aqueous solution $NH_4OH$ with stirring and the mixture is allowed to stand about an hour. The precipitate is then washed twice and dried in vacuum at 60° C. The product is brown. The catalyst is further reacted and conditioned under the conditions of reaction described hereafter.

Butene-2 is dehydrogenated to butadiene-1,3 in a jacketed fixed bed reactor which is 1 inch in diameter. The catalyst bed is 1½ inches deep. The LHSV is 1.0 and the steam and oxygen ratios are 20 and 0.6 mols respectively per mol of butene-2. At a reactor temperature of 350° C. the selectivity to butadiene-1,3 is 87 mol percent.

EXAMPLE 2

A catalyst is prepared according to this invention by reacting 129.9 grams of $La(NO_3)_3 \cdot 6H_2O$ with 202.2 grams of $Fe(NO_3)_3 \cdot 9H_2O$. The nitrates are dissolved with heat in 400 cc. distilled water and the mixed nitrates are slowly added to one liter of concentrated aqueous $NH_4OH$ solution with stirring. The mixture is then heated with stirring to 99° C. over a period of two hours. The precipitate is then washed and dried at 150° C. The catalyst is further reacted and conditioned under the conditions of reaction described hereafter.

Butene-2 is dehydrogenated to butadiene-1,3 in a jacketed fixed bed reactor which is 1 inch in diameter. The catalyst bed is 1¼ inches deep. The LHSV is 1.0 and the steam and oxygen ratios are 20 and 0.6 mols respectively per mol of butene-2. At a reactor temperature of 420° C., the selectivity to butadiene-1,3 is 89 mol percent per pass.

EXAMPLE 3

A catalyst is prepared from iron oxide and a mixed rare earth oxide. The rare earth oxide is Lindsay Code 422 with an approximate analysis by weight percent of 43.9 $La_2O_3$, 0.1 CeO, 8.9 $Pr_6OH$, 30.8 $Nd_2O_3$, 5.2 $Sm_2O_3$, 3.3 $Gd_2O_3$, 0.4 $Y_2O_3$ and 1.4 other rare earth oxides. 79.9 grams of $Fe_2O_3$ and 150.2 grams of the rare earth oxide are slurried in 300 cc. of distilled water and filtered and dried. The mixed oxides are reacted at 900° C. for about 2 hours. The catalyst is then coated on AMC alumina catalyst supports.

The reactor of Example 1 is employed employing 35 cc. of catalyst (2¾ inch bed). Butene-2 is dehydrogenated to butadiene-1,3 at a flow rate of 1.0 LHSV using 0.6 mols of oxygen and 20 mols of steam per mol of butene-2. The selectivity to butadiene-1,3 is 89 mol percent per pass at a reactor temperature of 415° C.

EXAMPLE 4

Example 3 is repeated with exception that helium is used instead of steam for the dehydrogenation. The results are similar with a slightly reduced selectivity.

Crystalline compositions of iron, oxygen and Group III–B metals are discussed in the Proceedings of the British Ceramic Society as published in Magnetic Ceramics No. 2, December 1964. The preparation of rare earth ferrites is disclosed in Y. D. Tretyakov, Vestn. Mosk. Univ. Ser. II. Khim 18, 59.

We claim:

1. A process for the oxidative dehydrogenation of hydrocarbon compounds having at least 4 carbon atoms which comprises contacting said hydrocarbon compound with a catalyst comprising a ferrite composition of iron, oxygen and a Periodic Table Group III–B metal wherein said ferrite composition has been formed by reacting (1) a member selected from the group consisting of iron oxide or precursors of iron oxide under the conditions of reaction to form said ferrite composition, and mixtures thereof with (2) a member selected from the group consisting of Group III–B metal oxide or precusors of an oxide of said Group III–B metal under the conditions of reaction to form said ferrite composition; the total of the atoms of said III–B metals being from .35 to .7 atom per atom of iron.

2. The process of claim 1 wherein Group III–B metal is initially present as a compound selected from the group consisting of an oxalate, hydroxide, nitrate, carbonate, salts of aliphatic monocarboxylic acids of 1 to 5 carbon atoms, sulfates, salts of aliphatic alcohols of 1 to 5 carbon atoms, hydrates thereof and mixtures thereof.

3. The process of claim 1 wherein the said ferrite composition is formed by heating precipitates of the Group III–B metal and iron compounds.

4. The method of claim 1 wherein the said ferrite composition is formed in the presence of halogen.

5. The process of claim 1 wherein the Group III–B metal ferrite is formed from a precursor of a Group III–B metal oxide and the Group III–B metal ferrite reactants are heated at a rate and temperature whereby the Group III–B metal oxide precursor is predominantly converted to the Group III–B metal oxide prior to the reaction to form the said Group III–B metal ferrite.

6. The process of claim 1 wherein the said hydrocarbon compound is an olefin.

7. The process of claim 1 wherein the said hydrocarbon compound is selected from the group consisting of normal butene, methyl butene and mixtures thereof.

8. The process of claim 1 wherein the said ferrite composition is formed at a reaction temperature of no greater than 600° C.

9. The process of claim 1 wherein the total of the atoms of the said III–B metals is from .35 to .6 atoms per atom of iron.

10. A process for the oxidative dehydrogenation of hydrocarbons of 4 to 5 carbon atoms having a straight chain of at least 4 carbon atoms which comprises contacting said hydrocarbon with a catalyst comprising a rare earth ferrite wherein said ferrite has been formed by reacting (1) a member selected from the group consisting of iron oxide or precursors of iron oxide under the conditions of reaction to form said ferrite composition, and mixtures thereof with (2) a member selected from the group consisting of rare earth metal oxide or precursors of an oxide of said rare earth metal or mixtures thereof under the conditions of reaction to form said ferrite; the total of the atoms of the said rare earth metals being from .35 to .7 atom per atom of iron.

References Cited

UNITED STATES PATENTS

| | | | |
|---|---|---|---|
| 1,207,706 | 12/1916 | Bosch et al. | 252—462 X |
| 3,231,519 | 1/1966 | Clark et al. | 252—462 |
| 3,409,697 | 11/1968 | Callahan et al. | 260—680 |
| 3,450,789 | 6/1969 | Kehl et al. | 260—680 |

PAUL M. COUGHLAN, JR., Primary Examiner

U.S. Cl. X.R.

23—DIG 1; 260—669 R, 683.3